(12) United States Patent
Kim et al.

(10) Patent No.: US 11,660,923 B2
(45) Date of Patent: May 30, 2023

(54) SUSPENSION FOR VEHICLE

(71) Applicant: HYUNDAI MOBIS Co., Ltd., Seoul (KR)

(72) Inventors: Young Ha Kim, Yongin-si (KR); Jin Wook Joo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/859,321

(22) Filed: Jul. 7, 2022

(65) Prior Publication Data
US 2023/0011251 A1    Jan. 12, 2023

(30) Foreign Application Priority Data
Jul. 7, 2021   (KR) .................. 10-2021-0089030

(51) Int. Cl.
*B60G 11/12*    (2006.01)

(52) U.S. Cl.
CPC ...... *B60G 11/125* (2013.01); *B60G 2202/114* (2013.01); *B60G 2204/41* (2013.01); *B60G 2204/43* (2013.01)

(58) Field of Classification Search
CPC ............ B60G 11/125; B60G 2202/114; B60G 2202/11; B60G 2204/121; B60G 11/08; B60G 11/10; B60G 21/026; B60G 2204/41; B60G 2204/41062; F16F 1/30; F16F 1/3835
See application file for complete search history.

(56) References Cited

U.S. PATENT DOCUMENTS

| | | | | |
|---|---|---|---|---|
| 1,328,601 A | * | 1/1920 | Spring | B60G 11/08 267/244 |
| 2,072,156 A | * | 3/1937 | Frank | B60G 11/08 267/45 |
| 5,016,861 A | * | 5/1991 | Thompson | F16F 1/18 267/52 |
| 2021/0379948 A1 | * | 12/2021 | Rosenmeyer | B60G 11/08 |

FOREIGN PATENT DOCUMENTS

| CN | 106347054 A | * | 1/2017 | |
|---|---|---|---|---|
| CN | 108980244 A | * | 12/2018 | ............. B60K 17/06 |
| CN | 111376668 A | * | 7/2020 | ............. B60G 11/08 |
| CN | 113059974 A | * | 7/2021 | |
| DE | 102014215871 A1 | * | 2/2016 | ............. B60G 11/08 |
| DE | 102016220325 A1 | * | 4/2018 | ............. B60G 11/08 |
| DE | 202022102445 U1 | * | 7/2022 | ............. B60G 11/20 |
| DE | 202022107063 U1 | * | 2/2023 | ............. B60G 11/08 |
| EP | 3121037 A1 | * | 1/2017 | ............. B60G 11/08 |
| EP | E P-3550172 A1 | * | 10/2019 | ............. B60G 11/113 |
| FR | 2991917 A1 | * | 12/2013 | ............. B60G 11/08 |
| KR | 10-2015-0113250 A | | 10/2015 | |
| WO | WO-2013041284 A1 | * | 3/2013 | ............. B60G 11/08 |
| WO | WO-2017215856 A1 | * | 12/2017 | ............. B60G 11/08 |
| WO | WO-2018054606 A1 | * | 3/2018 | ............. B60G 11/08 |

\* cited by examiner

*Primary Examiner* — Paul N Dickson
*Assistant Examiner* — Matthew D Lee
(74) *Attorney, Agent, or Firm* — Morgan, Lewis & Bockius LLP

(57) ABSTRACT

A suspension for a vehicle may include: a center leaf spring; side leaf springs respectively installed on opposing sides of the center leaf spring; mounting brackets configured to connect the center leaf spring and the side leaf springs, respectively; and damper bushes mounted in the mounting brackets, respectively, and configured to absorb shock.

13 Claims, 8 Drawing Sheets

SUSPENSION FOR VEHICLE

CROSS-REFERENCE TO RELATED APPLICATION

This application claims the benefit under 35 U.S.C. § 119(a) of priority to Korean Patent Application No. 10-2021-0089030 filed on Jul. 7, 2021 in the Korean Intellectual Property Office, the entire disclosure of which is incorporated herein by reference for all purposes.

BACKGROUND

Technical Field

Exemplary embodiments of the present disclosure relate to a suspension for a vehicle, and more particularly, to a suspension for a vehicle, which includes a leaf spring provided with the function of a shock absorber.

Discussion of the Background

In general, a suspension for a vehicle connects an axle and a vehicle body, and absorbs and buffers shock or vibration applied to the axle from the road during driving, such that the shock or vibration is not directly transferred to the vehicle body, thereby improving ride comfort while preventing damage to the vehicle body and luggage.

Such a suspension may be classified into a conventional suspension using the elastic force of a coil spring and a leaf spring suspension using the elastic force of a leaf spring, according to a method for buffering shock applied from the road.

The conventional suspension has a structure that performs a functional operation with various parts, and thus requires a large number of operations during an assembly process. Furthermore, since a large number of parts are required, the weight of a product is increased. The coil spring has a structure that stands in the height direction of the vehicle and supports the weight of the vehicle. The coil spring occupies a large volume in the suspension at the lower part of the vehicle. Furthermore, the coil spring requires a separate space for mounting a shock absorber, and thus reduces the interior space of the vehicle. Therefore, there is a need for a device capable of solving the problem.

The related art of the present disclosure is disclosed in Korean Patent Application Publication No. 10-2015-0113250 published on Oct. 8, 2015 and entitled "Leaf Spring Suspension."

SUMMARY

Various embodiments are directed to a suspension for a vehicle, which includes a leaf spring provided with the function of a shock absorber.

In an embodiment, a suspension for a vehicle may include: a center leaf spring; side leaf springs respectively installed on opposing sides of the center leaf spring; mounting brackets configured to connect the center leaf spring and the side leaf springs, respectively; and damper bushes mounted in the mounting brackets, respectively, and configured to absorb shock.

Each of the damper bushes may include: a hollow inner pipe; a vane mounted on an outer surface of the inner pipe; a mid-pipe configured to surround an outer surface of the vane and to contain fluid; a rubber bush mounted on an outer surface of the mid-pipe, and including an elastically deformable material; and an outer pipe rotatably mounted on an outer surface of the rubber bush, and accommodated in a corresponding one of the mounting brackets.

The fluid may include silicon oil.

The vane may include a plurality of blades which are radially extending on an outer surface of the vane in a circumferential direction.

Each of the damper bushes may further include a cap mounted on either end of the mid-pipe, and configured to block fluid leakage.

The inner pipe, the vane, the mid-pipe, and the outer pipe may be made of aluminum.

Each of the mounting brackets may include: a first mounting bracket connected to one of the side leaf springs, and having a corresponding one of the damper bushes mounted therein; and a second mounting bracket connected to the center leaf spring, and fastened to the first mounting bracket by a fastener.

The first mounting bracket may include: a first side connector connected to one of the side leaf springs; and a first main connector connected to the first side connector, having the corresponding one of the damper bushes mounted therein, and fastened to the second mounting bracket by the fastener.

The first main connector may include: a first main fastener fastened to the second mounting bracket by the fastener; and a first damper accommodation part having the corresponding one of the damper bushes mounted therein.

An elastically deformable mounting bush, through which the fastener is fastened, may be mounted in the first main fastener.

The second mounting bracket may include: a second center connector connected to the center leaf spring; and a second main connector connected to the second center connector, and fastened to the first mounting bracket by the fastener.

The first mounting bracket and the second mounting bracket may be made of aluminum.

The center leaf spring and the side leaf springs may be made of Glass Fiber Reinforced Plastic (GFRP).

The suspension for a vehicle in accordance with the embodiment of the present disclosure may perform a damper function of absorbing shock of the vehicle, which makes it possible to reduce the number of parts, the number of assembly operations, and the assembly time.

Furthermore, in accordance with the present disclosure, the reduction in the number of parts may decrease the weight of the product, and improve the fuel efficiency of the vehicle.

Furthermore, the suspension for a vehicle in accordance with the present disclosure does not require a separate space for mounting a shock absorber, which makes it possible to expand the interior space of the vehicle.

DETAILED DESCRIPTION OF THE ILLUSTRATED EMBODIMENTS

Hereinafter, a suspension for a vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
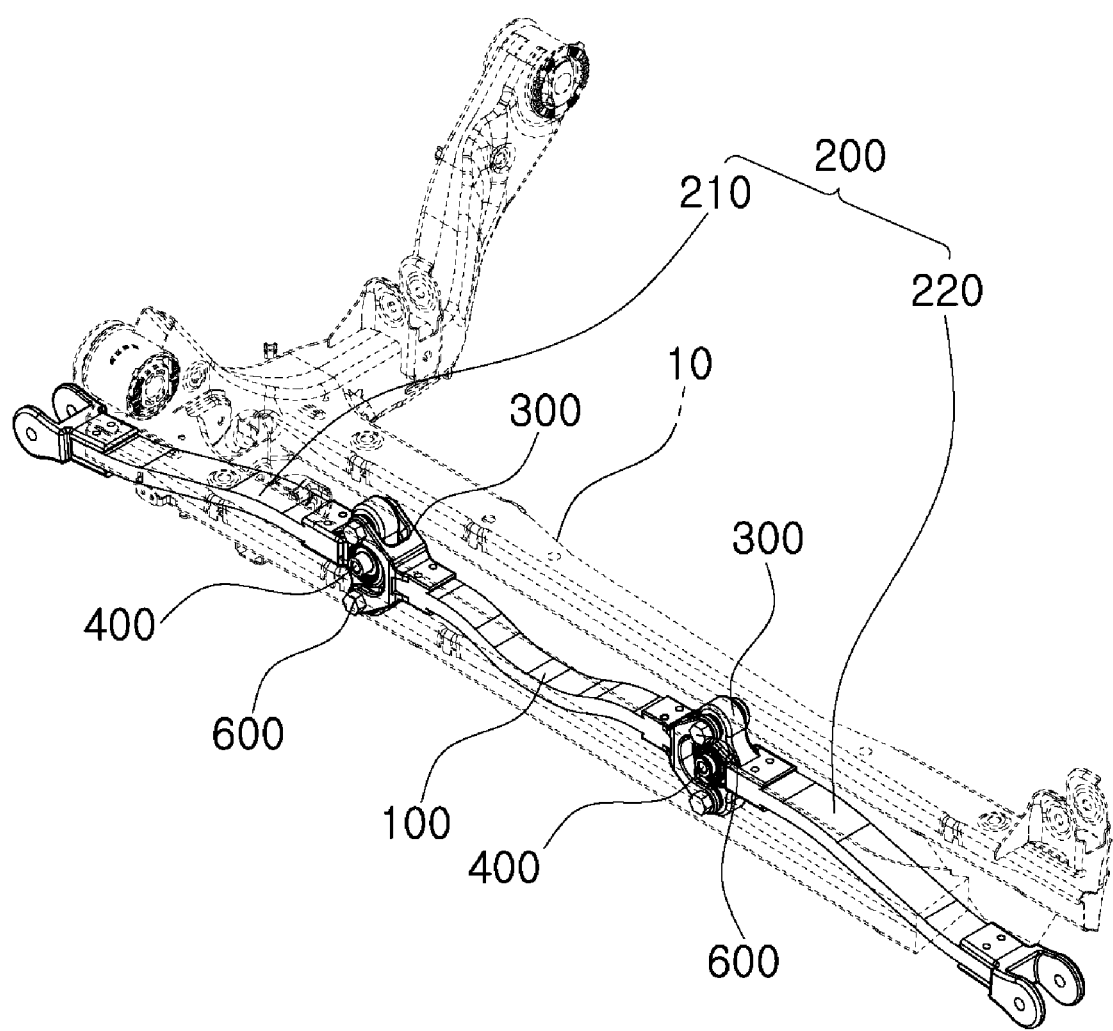
FIG. 1 is a perspective view schematically illustrating that a suspension for a vehicle in accordance with an embodiment of the present disclosure is mounted on a rear wheel member.
Figure 2:
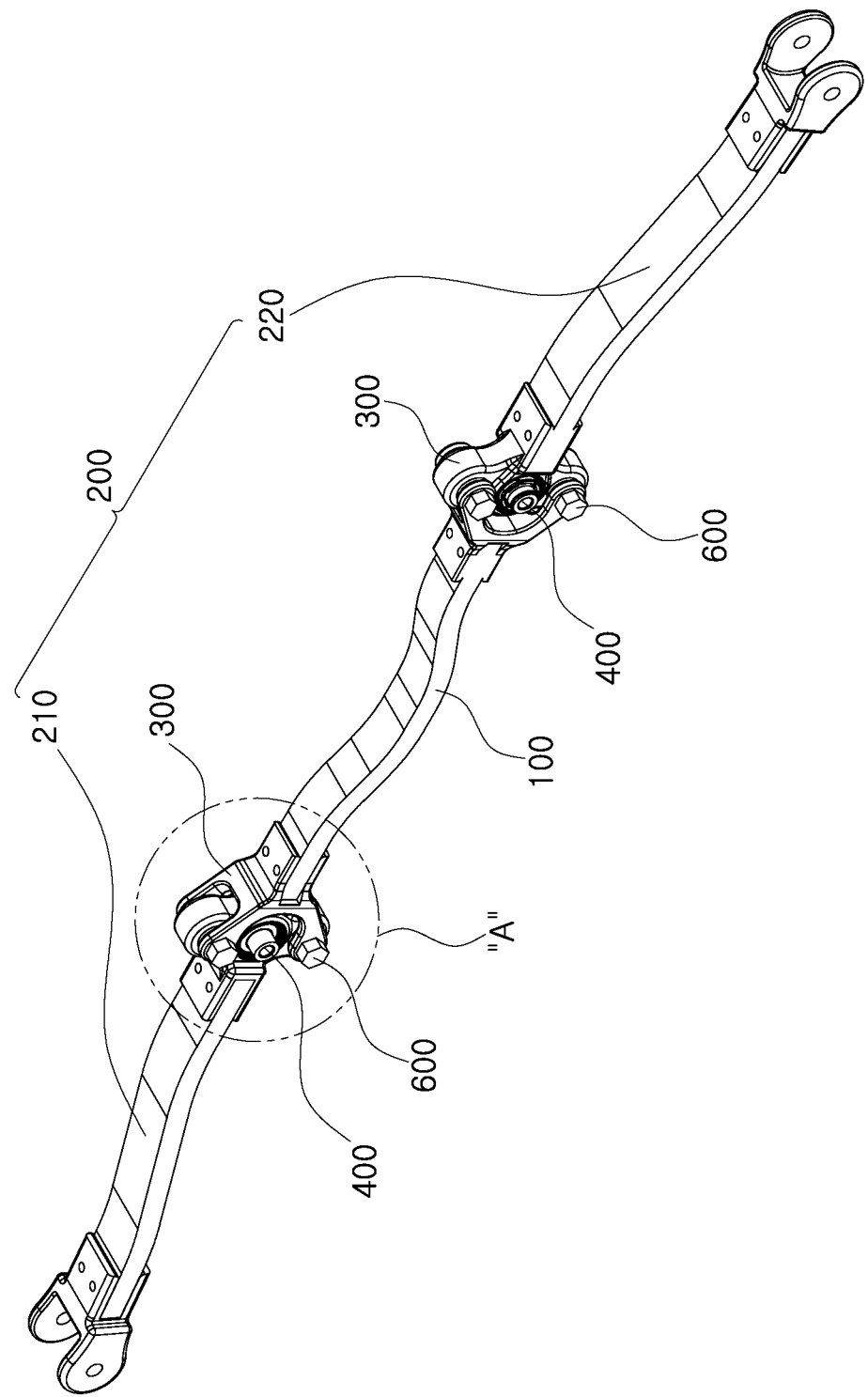
FIG. 2 is a perspective view schematically illustrating the suspension for a vehicle in accordance with the embodiment of the present disclosure.
Figure 3:
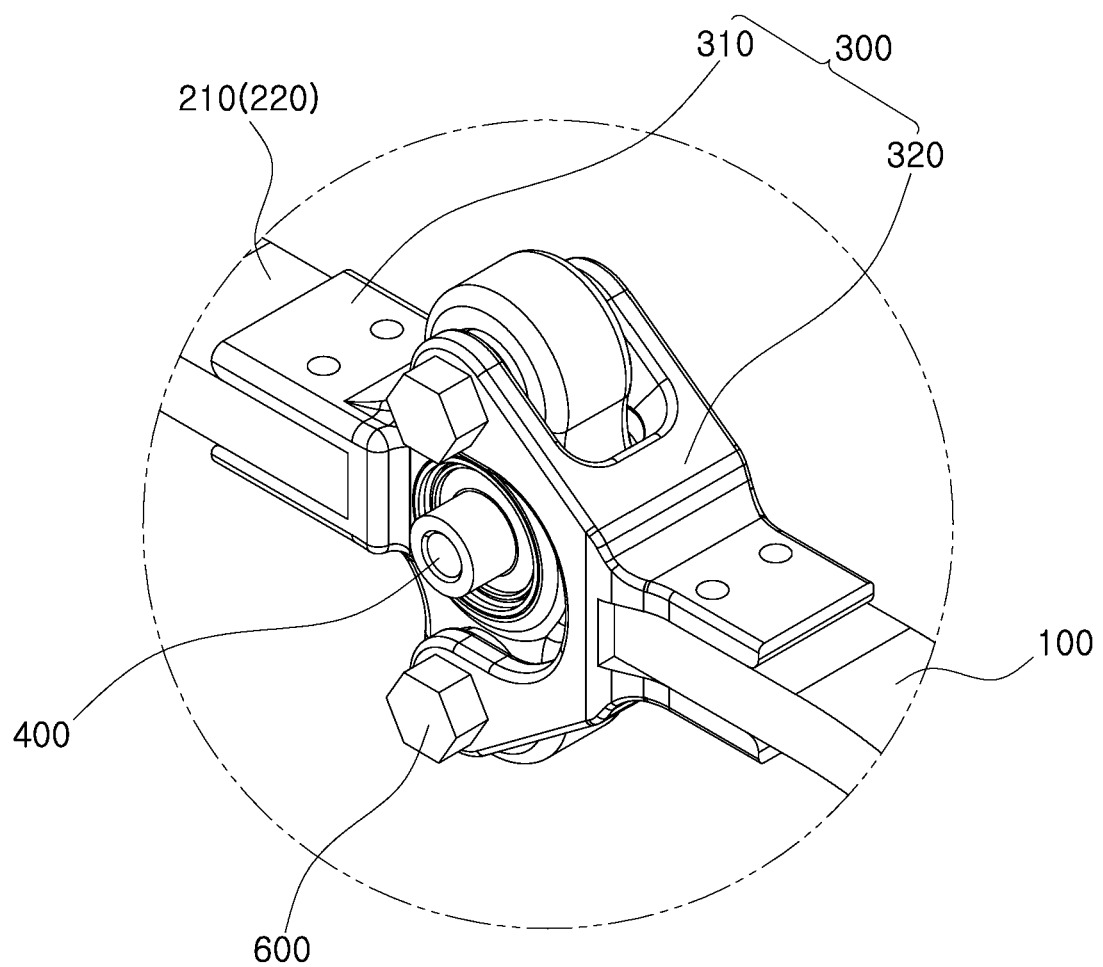
FIG. 3 is a partially expanded perspective view schematically illustrating a portion "A" of FIG. 2.
Figure 4:
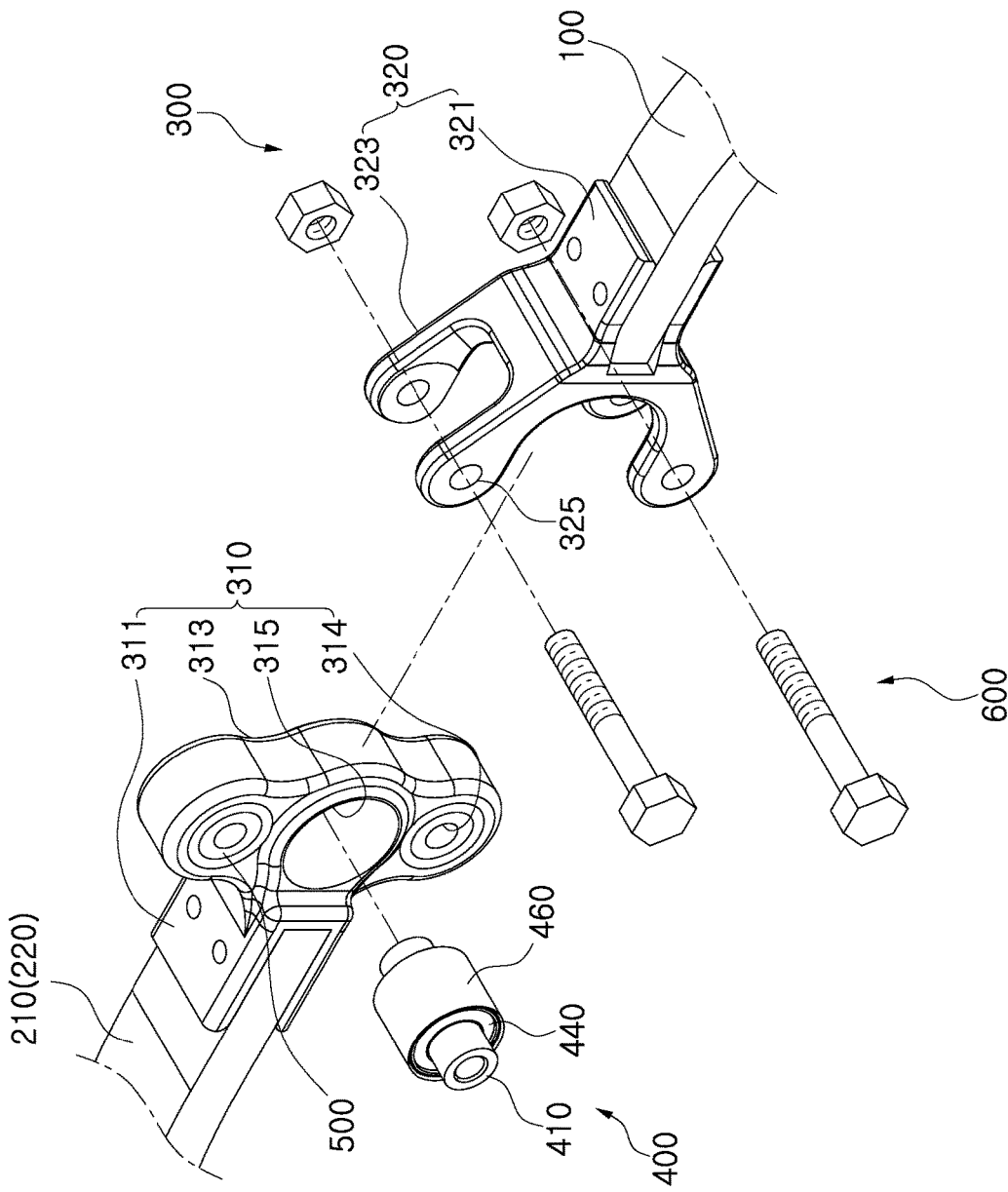
FIG. 4 is an assembled perspective view schematically illustrating main components of the suspension for a vehicle in accordance with the embodiment of the present disclosure.
Figure 5:
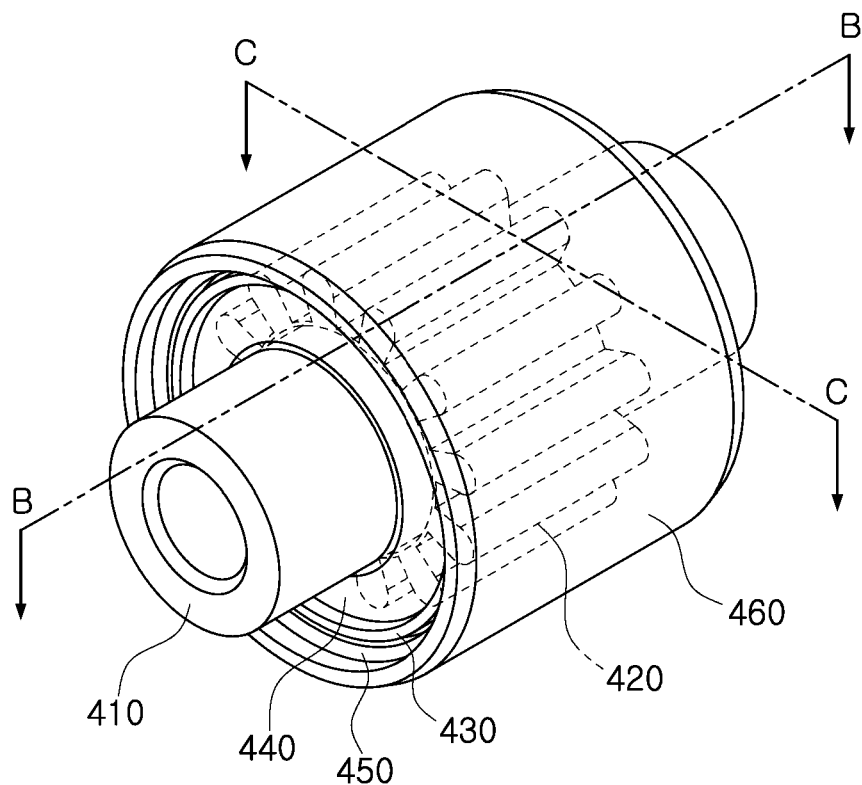
FIG. 5 is a perspective view schematically illustrating a damper bush of the suspension for a vehicle in accordance with the embodiment of the present disclosure.
Figure 6:
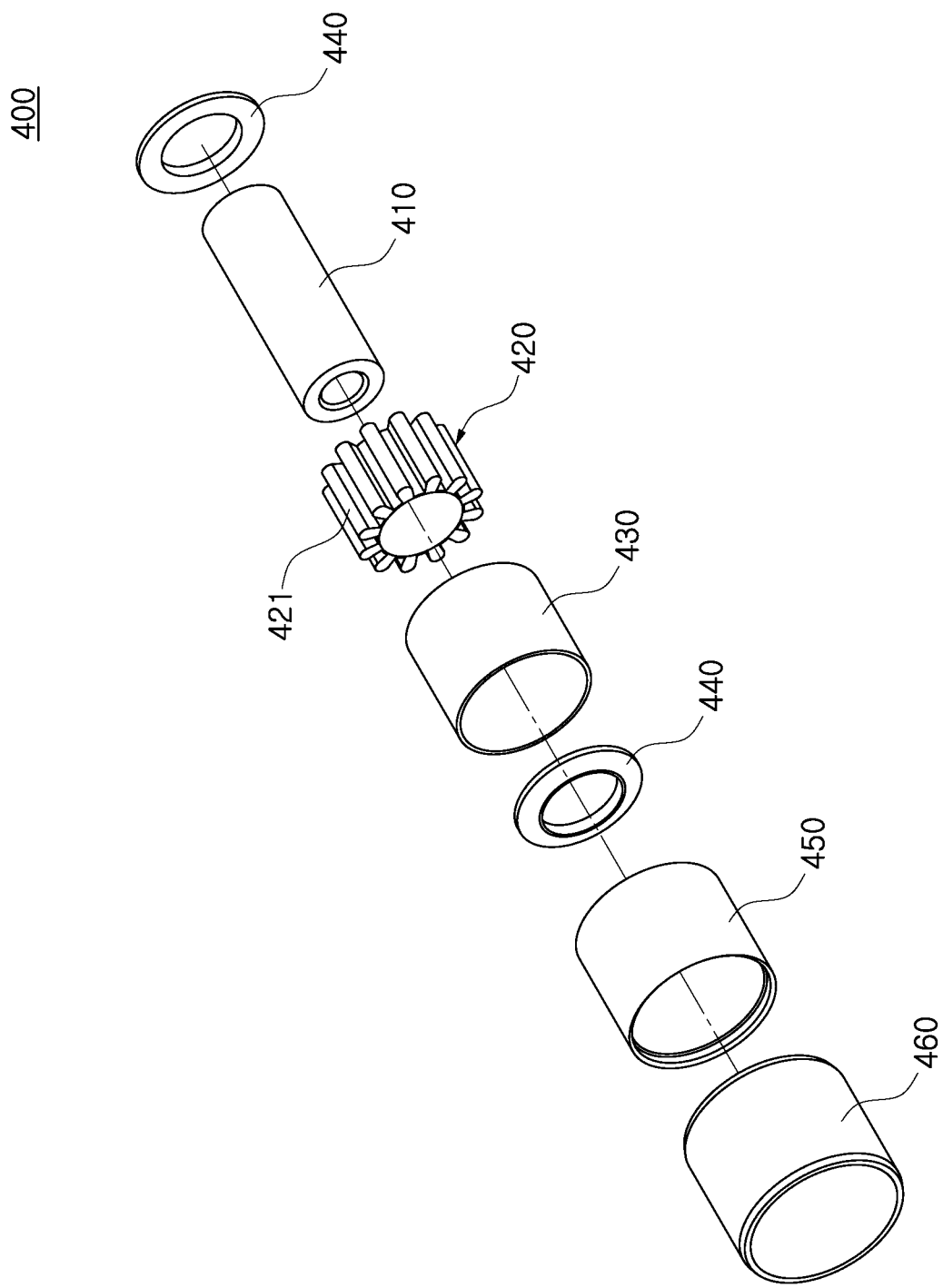
FIG. 6 is an assembled perspective view schematically illustrating the damper bush of the suspension for a vehicle in accordance with the embodiment of the present disclosure.
Figure 7:
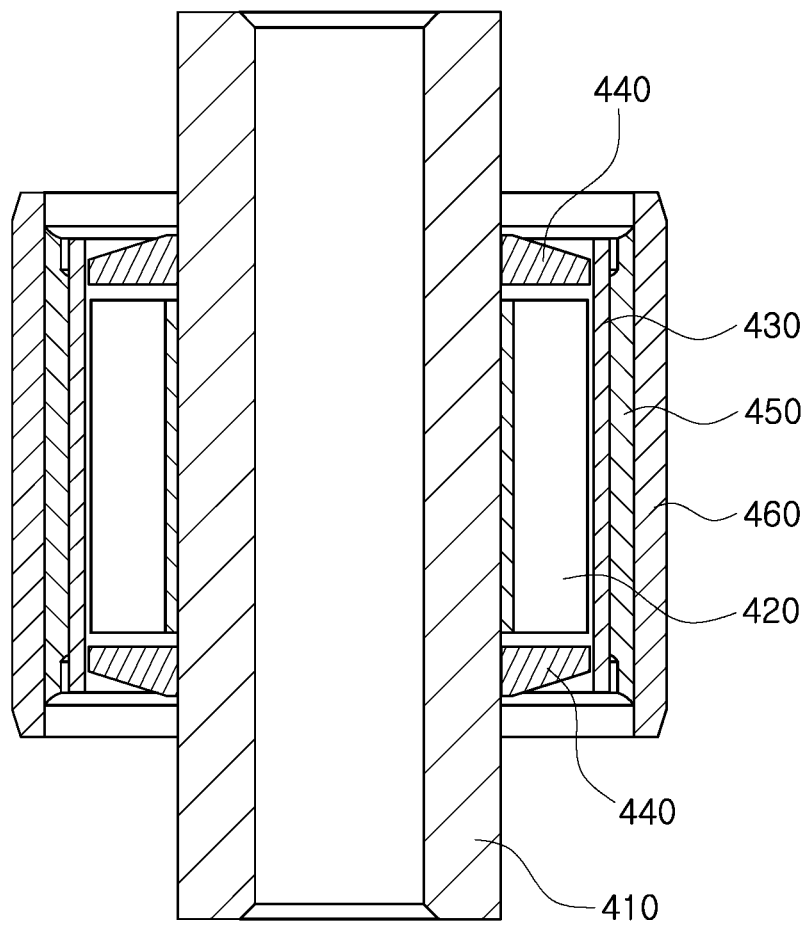
FIG. 7 is a cross-sectional view taken along line B-B of FIG. 5.
Figure 8:
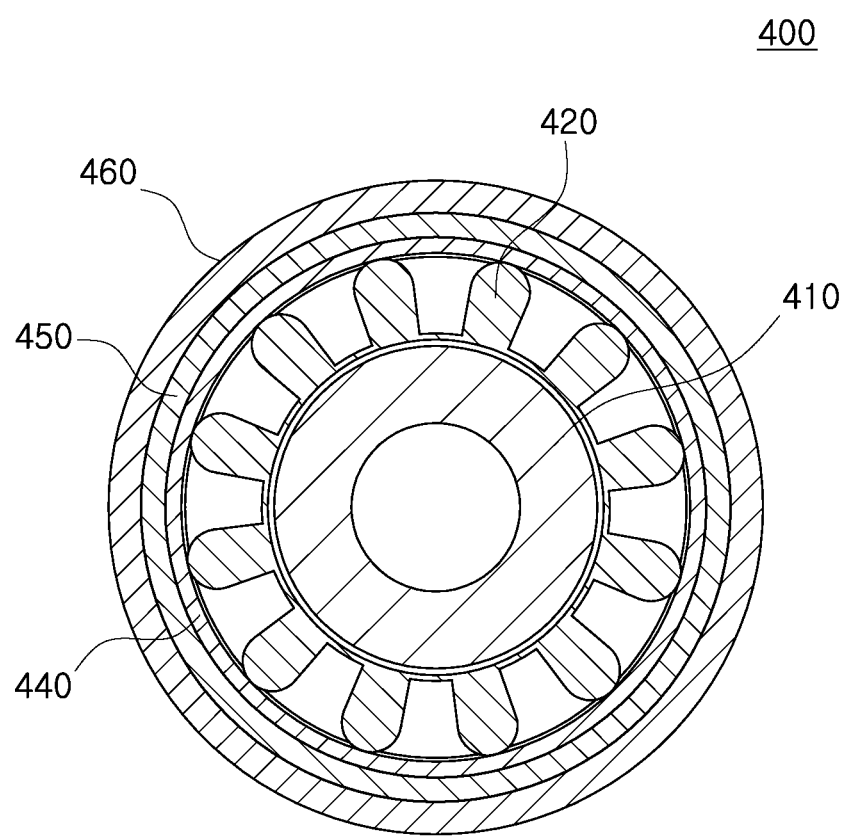
FIG. 8 is a cross-sectional view taken along line C-C of FIG. 5.

FIG. 1 is a perspective view schematically illustrating that a suspension for a vehicle in accordance with an embodiment of the present disclosure is mounted on a rear wheel member, FIG. 2 is a perspective view schematically illustrating the suspension for a vehicle in accordance with the embodiment of the present disclosure, FIG. 3 is a partially expanded perspective view schematically illustrating a portion "A" of FIG. 2, FIG. 4 is an assembled perspective view schematically illustrating main components of the suspension for a vehicle in accordance with the embodiment of the present disclosure, FIG. 5 is a perspective view schematically illustrating a damper bush of the suspension for a vehicle in accordance with the embodiment of the present disclosure, FIG. 6 is an assembled perspective view schematically illustrating the damper bush of the suspension for a vehicle in accordance with the embodiment of the present disclosure, FIG. 7 is a cross-sectional view taken along line B-B of FIG. 5, and FIG. 8 is a cross-sectional view taken along line C-C of FIG. 5.

Referring to FIGS. 1 to 8, the suspension for a vehicle in accordance with the embodiment of the present disclosure includes a center leaf spring 100, a plurality of side leaf springs 200, a plurality of mounting brackets, and a plurality of damper bushes 400. The suspension for a vehicle in accordance with the embodiment of the present disclosure is mounted on a rear wheel member 10, and performs a damper function of absorbing shock of the vehicle.

The center leaf spring 100 may be formed in a curved shape so as to be elastically deformable, and thus absorb and reduce shock applied from the outside.

The side leaf spring 200 may be formed in a curved shape so as to be elastically deformable, and thus absorb and reduce shock applied from the outside. The plurality of side leaf springs 200 are installed on either side of the center leaf spring 100. The side leaf spring 200 is connected to the center leaf spring 100 by the mounting bracket 300.

The side leaf spring 200 includes a first side leaf spring 210 installed on one side (left side in FIG. 2) of the center leaf spring 100 and a second side leaf spring 220 installed on the other side (right side in FIG. 2) of the center leaf spring 100. The first side leaf spring 210 and the second side leaf spring 220 are disposed on the left and right sides of the center leaf spring 100, respectively, and achieve the balance between the left and right sides of the center leaf spring 100.

In the present disclosure, the center leaf spring 100 and the side leaf spring 200 are made of Glass Fiber Reinforced Plastic (GFRP). The GFRP of the center leaf spring 100 and the side leaf spring 200 is formed through a process of forming a glass filament in the shape of winding or fabric, impregnating the glass filament with resin, and hardening the glass filament impregnated with resin. Since the center leaf spring 100 and the side leaf spring 200 are made of GFRP, the weight of a product may be reduced, and the fuel efficiency of the vehicle may be improved.

The mounting bracket 300 connects the center leaf spring 100 and the side leaf spring 200. The mounting bracket 300 may reduce shock by connecting the center leaf spring 100 and the side leaf spring 200. The mounting bracket 300 includes a first mounting bracket 310 and a second mounting bracket 320.

The first mounting bracket 310 is connected to the side leaf spring 200. The first mounting bracket 310 includes a first side connector 311 and a first main connector 313.

The first mounting bracket 310 is connected to the side leaf spring 200, and the damper bush 400 is mounted in the first mounting bracket 310. The first mounting bracket 310 includes the first side connector 311 and the first main connector 313.

The first side connector 311 is formed in a U-shape whose one side (left side in FIG. 4) is open, and serves to accommodate the side leaf spring 200 (the first side leaf spring 210). The other side (right side in FIG. 4) of the first side connector 311 is connected to the first main connector 313.

The first main connector 313 is connected to the first side connector 311, and the damper bush 400 is mounted in the first main connector 313. The first main connector 313 is fastened to the second mounting bracket 320 by a fastener. The first main connector 313 is fastened to a second main connector 323 of the second mounting bracket 320 by the fastener 600.

The fastener 600 is configured as a combination of a bolt and a nut. The bolt of the fastener 600 is passed through a fastening hole 325 of the second main connector 323 and the first main connector 313, and an end portion of the bolt of the fastener 600 is fixed by the nut of the fastener 600.

The first main connector 313 includes a first main fastener 314 and a first damper accommodation part 315. The first main fastener 314 is fastened to the second mounting bracket 320 by the fastener 600. The bolt of the fastener 600 is passed through the fastening hole 325 of the second main connector 323 and the first main fastener 314 of the first main connector 313, and an end portion of the bolt of the fastener 600 is fixed by the nut of the fastener 600.

A mounting bush 500 which is elastically deformable and through which the fastener 600 is fastened is mounted on the first main fastener 314. The mounting bush 500 is made of elastically deformable rubber. The mounting bush 500 is mounted on the inner surface of the first main fastener 314, and serves to absorb external shock.

The first damper accommodation part 315 is formed in a hollow shape, and the damper bush 400 is mounted in the first damper accommodation part 315.

The second mounting bracket 320 is connected to the center leaf spring 100, and fastened to the first mounting bracket 310 by the fastener 600. The second mounting bracket 320 includes a second center connector 321 and the second main connector 323.

The second center connector 321 is connected to the center leaf spring 100. The second center connector 321 is formed in a U-shape whose one side (right side in FIG. 4) is open, and serves to accommodate the center leaf spring 100. The other side (left side in FIG. 4) of the second center connector 321 is connected to the second main connector 323.

The second main connector 323 is connected to the second center connector 321, and fastened to the first mounting bracket 310 by the fastener 600. The bolt of the fastener 600 is passed through the fastening hole 325 of the second main connector 323 and the first main connector 313, and an end portion of the bolt of the fastener 600 is fixed by the nut of the fastener 600.

In the present disclosure, the first mounting bracket 310 and the second mounting bracket 320 are made of aluminum. Since the first mounting bracket 310 and the second mounting bracket 320 are made of aluminum which is a light metal, the weight of a product may be reduced, and the fuel efficiency of the vehicle may be improved.

The damper bush 400 is mounted in the mounting bracket 300, and serves to absorb shock. The damper bush 400 includes an inner pipe 410, a vane 420, a mid-pipe 430, a rubber bush 450, and an outer pipe 460.

The inner pipe 410 is formed in a hollow shape. The vane 420 is mounted on the outer surface of the inner pipe 410. The vane 420 includes a plurality of blades 421 which are radially formed on the outer surface thereof in the circumferential direction.

Spaces are formed between the blades 421 of the vane 420 and the mid-pipe 430, and fluid is contained between the blades 421 and the mid-pipe 430. This fluid is made of silicon oil. Silicon oil is made of liquid silicon having a low polymerization degree, is oily liquid having no taste and smell, and has a low freezing point and a small change in viscosity according to temperature.

The silicon oil contained between the blades 421 of the vane 420 and the mid-pipe 430 is moved by the rotation of the outer pipe 460 when external shock is applied to the vehicle, and absorbs the external shock through friction.

The mid-pipe 430 surrounds the outer surface of the vane 420, such that the fluid is contained between the blades 421 of the vane 420. The inner surface of the mid-pipe 430 comes into contact with end portions of the blades 421 of the vane 420.

The rubber bush 450 is mounted on the outer surface of the mid-pipe 430, and includes an elastically deformable material. The rubber bush 450 is made of elastically deformable rubber, and thus elastically deformed to absorb external shock, when the external shock is applied to the vehicle.

The outer pipe 460 is rotatably mounted on the outer surface of the rubber bush 450. The outer pipe 460 is accommodated in the mounting bracket 300. The outer pipe 460 is rotatably mounted in the first damper accommodation part 315 of the mounting bracket 300.

The outer pipe 460 is accommodated and mounted in the mounting bracket 300, and rotated in the first damper accommodation part 315 of the mounting bracket 300 when external shock is applied to the vehicle.

The damper bush 400 in accordance with the present disclosure further includes a cap 440. The cap 440 is mounted on each of both end portions (upper and lower end portions in FIG. 7) of the mid-pipe 430, and serves to block the leakage of fluid.

The cap 440 is mounted on the mid-pipe 430 by press-fitting or bonding. The cap 440 may block the leakage of fluid contained between the blades 421 of the vane 420 and the mid-pipe 430.

In the present disclosure, the inner pipe 410, the vane 420, the mid-pipe 430, and the outer pipe 460 are made of aluminum. Since the inner pipe 410, the vane 420, the mid-pipe 430, and the outer pipe 460 are made of aluminum which is a light metal, the weight of a product may be reduced, and the fuel efficiency of the vehicle may be improved.

The suspension for a vehicle in accordance with the embodiment of the present disclosure may perform a damper function of absorbing shock of the vehicle, which makes it possible to reduce the number of parts, the number of assembly operations, and the assembly time.

Furthermore, in accordance with the present disclosure, the reduction in the number of parts may decrease the weight of the product, and improve the fuel efficiency of the vehicle.

Furthermore, the suspension for a vehicle in accordance with the present disclosure does not require a separate space for mounting a shock absorber, which makes it possible to expand the interior space of the vehicle.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension for a vehicle, comprising:
   a center leaf spring;
   side leaf springs respectively installed on opposing sides of the center leaf spring;
   mounting brackets configured to connect the center leaf spring and the side leaf springs, respectively; and
   damper bushes mounted in the mounting brackets, respectively, and configured to absorb shock.

2. The suspension of claim 1, wherein each of the damper bushes comprises:
   a hollow inner pipe;
   a vane mounted on an outer surface of the inner pipe;
   a mid-pipe configured to surround an outer surface of the vane and to contain fluid;
   a rubber bush mounted on an outer surface of the mid-pipe, and including an elastically deformable material; and
   an outer pipe rotatably mounted on an outer surface of the rubber bush, and accommodated in a corresponding one of the mounting brackets.

3. The suspension of claim 2, wherein the fluid comprises silicon oil.

4. The suspension of claim 2, wherein the vane comprises a plurality of blades which are radially extending on an outer surface of the vane in a circumferential direction.

5. The suspension of claim 2, wherein each of the damper bushes further comprises a cap mounted on either end of the mid-pipe, and configured to block fluid leakage.

6. The suspension of claim 2, wherein the inner pipe, the vane, the mid-pipe, and the outer pipe are made of aluminum.

7. The suspension of claim 1, wherein each of the mounting brackets comprises:

a first mounting bracket connected to one of the side leaf springs, and having a corresponding one of the damper bushes mounted therein; and a second mounting bracket connected to the center leaf spring, and fastened to the first mounting bracket by a fastener.

8. The suspension of claim 7, wherein the first mounting bracket comprises:

a first side connector connected to one of the side leaf springs; and a first main connector connected to the first side connector, having the corresponding one of the damper bushes mounted therein, and fastened to the second mounting bracket by the fastener.

9. The suspension of claim 8, wherein the first main connector comprises:

a first main fastener fastened to the second mounting bracket by the fastener; and a first damper accommodation part having the corresponding one of the damper bushes mounted therein.

10. The suspension of claim 9, wherein an elastically deformable mounting bush, through which the fastener is fastened, is mounted in the first main fastener.

11. The suspension of claim 7, wherein the second mounting bracket comprises:

a second center connector connected to the center leaf spring; and a second main connector connected to the second center connector, and fastened to the first mounting bracket by the fastener.

12. The suspension of claim 7, wherein the first mounting bracket and the second mounting bracket are made of aluminum.

13. The suspension of claim 1, wherein the center leaf spring and the side leaf springs are made of Glass Fiber Reinforced Plastic (GFRP).

\* \* \* \* \*